US012710999B2

(12) United States Patent
Schaude

(10) Patent No.: US 12,710,999 B2
(45) Date of Patent: Aug. 18, 2026

(54) ARCHIVING PLUG-IN OPTIMIZATION

(71) Applicant: SAP SE, Walldorf (DE)

(72) Inventor: Horst Schaude, Kraichtal (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/882,520

(22) Filed: Sep. 11, 2024

(65) Prior Publication Data

US 2026/0072764 A1 Mar. 12, 2026

(51) Int. Cl.

*G06F 9/455* (2018.01)
*G06F 8/65* (2018.01)
*G06F 9/52* (2006.01)
*G06F 16/11* (2019.01)
*G06F 21/60* (2013.01)

(52) U.S. Cl.

CPC .............. *G06F 9/52* (2013.01); *G06F 16/113* (2019.01); *G06F 21/604* (2013.01); *G06F 2221/2141* (2013.01)

(58) Field of Classification Search

None
See application file for complete search history.

(56) References Cited

U.S. PATENT DOCUMENTS 6,138,238 A * 10/2000 Scheifler ............ G06F 21/6281 710/200
6,560,615 B1 * 5/2003 Zayas ................ G06F 11/1451 707/823
8,671,406 B1 * 3/2014 Gopal ................ G06F 9/45533 718/1
11,755,616 B2 * 9/2023 Kleinpeter ............. G06F 16/11 707/610
2008/0319996 A1 * 12/2008 Cook ................. G06F 11/1435
2015/0142749 A1 * 5/2015 Broll ...................... G06F 16/27 707/654
2016/0149925 A1 * 5/2016 Faitelson ............. G06F 21/604 707/785
2017/0041256 A1 * 2/2017 Henderson ............. H04L 51/42
2019/0334919 A1 * 10/2019 Le Roy ................ G06F 21/604
2020/0202034 A1 * 6/2020 Gaijar ................ G06F 21/6272
2021/0240732 A1 * 8/2021 Kleinpeter ............. G06F 16/11
2022/0179986 A1 * 6/2022 Veeramachaneni ... G06F 3/0622

* cited by examiner

*Primary Examiner* — Hyun Nam
(74) *Attorney, Agent, or Firm* — SCHWEGMAN LUNDBERG & WOESSNER, P.A.

(57) ABSTRACT

In an example embodiment, at the beginning of a session of a software application, the archiving plug-in determines whether there is any archived data for each possible archived object type. A flag can then be set indicating whether there are or are not any archived data for any possible archived object type. Then, when a call comes into the archiving plug-in (such as when a search is performed), rather than blindly checking the archive for matching data and determining whether the matching data can be accessed by the searching user, the flag is checked first. Only if the flag indicates that there are archived data for some possible archived object type will the call be serviced. Otherwise the call will be ignored/stopped.

20 Claims, 4 Drawing Sheets

ARCHIVING PLUG-IN OPTIMIZATION

BACKGROUND

Data archiving is the process of moving data that is no longer actively used to a separate storage device for long-term retention. Data may be archived for several reasons, such as for regulatory compliance. Data archives may be indexed and have search capabilities so that archived data can be located and retrieved.

BRIEF DESCRIPTION OF THE DRAWINGS

Some example embodiments of the present disclosure are illustrated by way of example and not limitation in the figures of the accompanying drawings, in which like reference numbers indicate similar elements.

DETAILED DESCRIPTION

Figure 1:
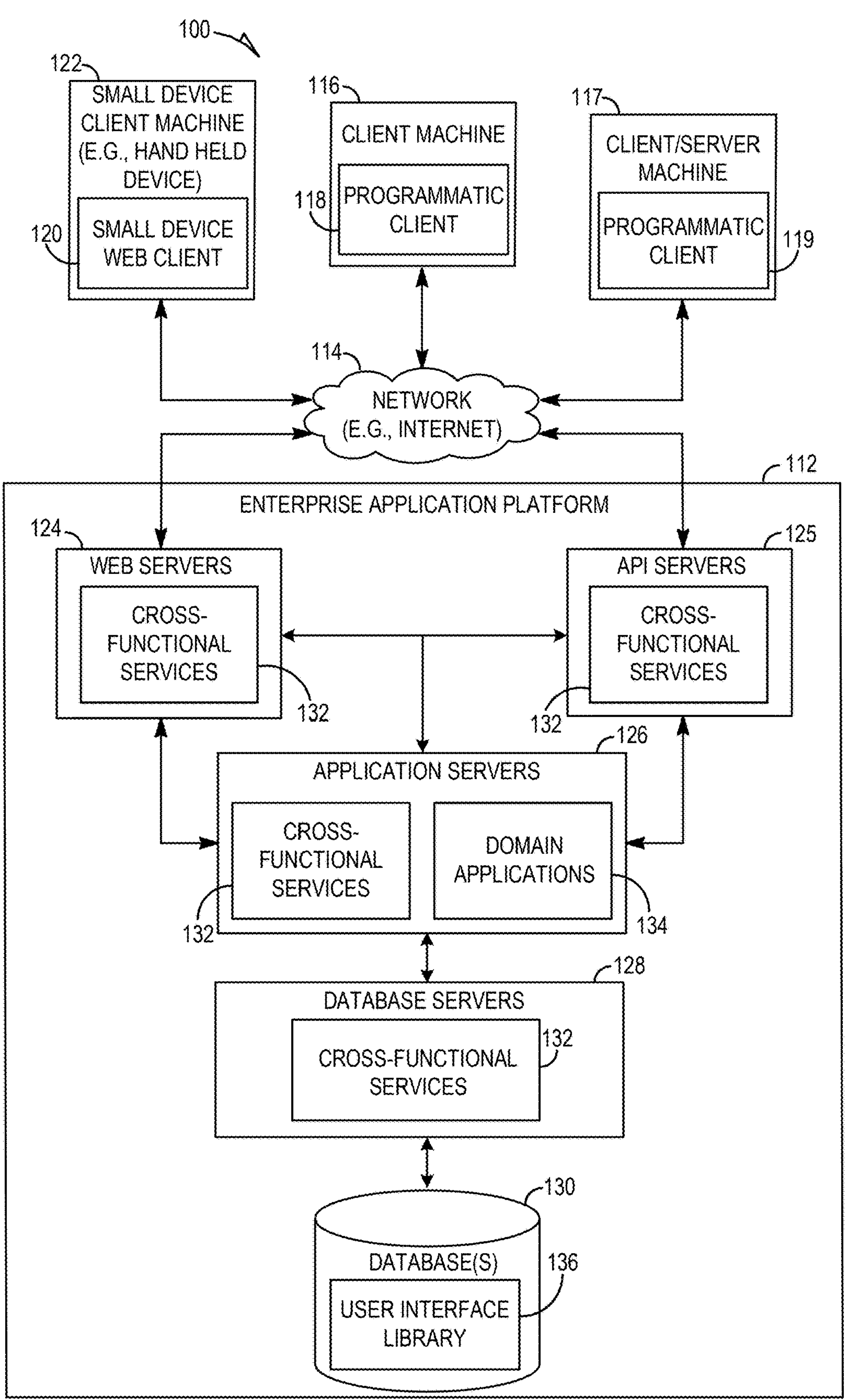
FIG. 1 is an example network diagram illustrating a system, in accordance with an example embodiment.

Example methods and systems of implementing access control for archived objects are disclosed. In the following description, for purposes of explanation, numerous specific details are set forth in order to provide a thorough understanding of example embodiments. It will be evident, however, to one skilled in the art that the present embodiments can be practiced without these specific details.

An object is a self-contained software entity that comprises data and functions to manipulate data. Data of an object may contain information regarding any personal or private data access restrictions that should be applied to the data. The object format may contain special sections that can be interpreted by an access control framework to determine these data access restrictions. Data that is in a production system is typically available in the format of the object. Therefore, an access control process can be called to verify whether a user has access to the data in the production system.

Special authorization is often needed to access archived data. In addition to these protections, it is also often desirable to exclude archived data from search results for normal users, to avoid clutter in a graphical user interface. Nevertheless, it is often desirable for indirect access to archived data to be permitted (i.e., not interrupted), such as when it is part of a document flow.

As such, a special archiving plug-in, which plugs into a normal archiving process flow at a software application, is utilized. The special archiving plug-in acts to check whether a requested object is permitted to be accessed. This special archiving plug-in is typically loaded into system memory when the software application is launched. The plug-in runs in the background, determining, when a search for data is made, whether or not to retrieve data from an archive (e.g., determine whether the user performing the search is authorized to access the archived data).

A technical issue arises, however, in scenarios where the archive is empty. Since many archiving processes involve archiving objects that are older than a particular set period of time (e.g., older than two years), there is a period of time where a new organization or at least an organization whose data is new will not have any objects that need to be archived yet. Nevertheless, the archiving plug-in still must be launched and run in the background in case data is eventually archived by the organization. The result is that the archiving plug-in needlessly determines whether there is archived data in the archive that matches a search and whether the searching user can access the data. This adds unnecessary overhead to the system and results in extra processing and other resource utilization.

In an example embodiment, at the beginning of a session of a software application, the archiving plug-in determines whether there is any archived data for each possible archived object type. A flag can then be set indicating whether there are or are not any archived data for any possible archived object type. Then, when a call comes into the archiving plug-in (such as when a search is performed), rather than blindly checking the archive for matching data and determining whether the matching data can be accessed by the searching user, the flag is checked first. Only if the flag indicates that there are archived data for some possible archived object type will the call be serviced. Otherwise, the call will be ignored/stopped.

FIG. 1 is an example network diagram illustrating a system 100, in accordance with an example embodiment. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134. The web servers 124 and the API servers 125 may be combined.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. In some example embodiments, the system 100 comprises a client-server system that employs a client-server architecture, as shown in FIG. 1. However, the embodiments of the present disclosure are, of course, not limited to a client-server architecture, and could equally well find application in a distributed, or peer-to-peer, architecture system.

Figure 2:
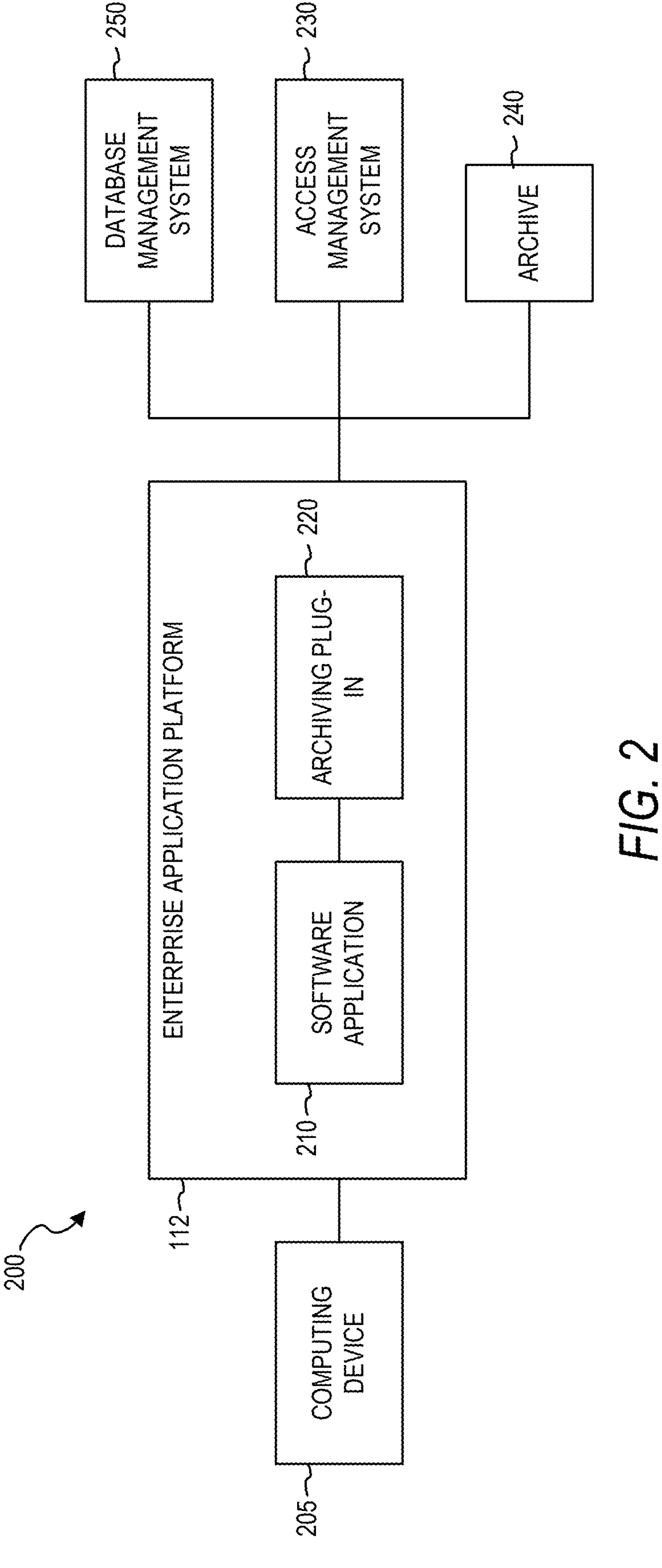
FIG. 2 is a block diagram illustrating an example archive access system, in accordance with an example embodiment.

FIG. 2 is a block diagram illustrating an example archive access system 200, in accordance with an example embodiment. The archive access system 200 may be configured to implement access control for archived objects. In some example embodiments, the archive access system 200 may comprise any combination of one or more of a software application 210, an archiving plug-in 220, an access management system 230, and an archive 240. The components shown in FIG. 2 may be configured to communicate with each other via one or more network connections, such as via the network 114 in FIG. 1. In some example embodiments, one or more of the components of the archive access system 200 may be implemented by the enterprise application platform 112 of FIG. 1. For example, the software application 210 and the archiving plug-in 220 may be incorporated into the enterprise application platform 112. The access management system 230 and the archive 240 may also be incorporated into the enterprise application platform 112, or, alternatively, may be incorporated into a separate computer system.

The software application 210 may comprise an enterprise application. An enterprise application is a large software system platform designed to operate in an organization, such as business or government. Enterprise applications may comprise a group of programs with shared business applications and organizational modeling utilities, and they may be developed using enterprise architecture. Enterprise applications may be configured to provide services including, but not limited to, online shopping and payment processing, interactive product catalogs, computerized billing systems, content management, information technology service management, enterprise resource planning, business intelligence, human resource management, manufacturing, application integration, forms automation, sales force automation, and business process management.

In some example embodiments, the software application 210 may be configured to create objects, such as in response to instructions or input provided by a user of a computing device 205 accessing the software application 210. The objects may comprise entities within a multi-tiered software application that works in conjunction with data access and domain logic layers to transport data. One example of such an object is a business object. A business object may comprise a container for application data, such as a customer or an invoice. Data may be exchanged between software components by business objects. A business object may contain fields that have a name, a type (e.g., a scalar type or another business object), a default value (e.g., for scalar types), and cardinality. Other types of objects are also within the scope of the present disclosure.

The data of objects created via the software application 210 may have an original format. For example, upon creation, the objects may have an Extensible Markup Language (XML) format or a JavaScript® Object Notation (JSON) format. Other types of formats are also within the scope of the present disclosure. The data of these objects may be stored in a database within a database management system 250. In some example embodiments, this data may be archived. For example, the database management system 250, or some other component of the archive access system 200, may move the data from the database of the database management system 250 to the archive 240. The archive 240 may comprise a storage device that is separate from the database of the database management system 250. The archived data may be stored in the archive 240 in a first format that is configured specifically for data archival. For example, the archived data may be stored in a binary large object (BLOB) format. BLOB is a data type that can store binary objects or data. BLOB may comprise a collection of binary data stored as a single entity. Other types of formats may be used for the first format of the archived data.

The archiving plug-in 220 may comprise a plug-in, or some other software component, that provides additional functionality to the software application 210. The archiving plug-in 220 may enable effective and efficient access control to the archive 240. By connecting the archiving plug-in 220 to the software application 210, the access management system 230, and the archive 240, the archive access system 200 provides secure access to users of the software application to the contents of the archive 240.

In some example embodiments, the archiving plug-in 220 may be configured to receive, from the software application 210, a first request to retrieve archived data from an archive 240. The first request may be associated with a user of the software application 210. For example, the user may use the software application 210 to perform a search for data and be presented with matches between the query of the search and one or more entries of data in the archive 240. These matches or hits may be presented as a collection in a hit list. Each hit may be labeled with a measurement or some other indication of the closeness of the match between the query and the corresponding data record. The user may use the software application 210 to select one or more of the data records in the hit list for retrieval from the archive 240. Based on the user selection of the data record(s) in the hit list, the software application 210 may send the first request, to the archiving plug-in 220, to retrieve, from the archive 240, the archived data that corresponds to the user selection.

Prior to the hit list being delivered to the software application 210 for view and selection from the user, however, it first needs to be generated. This is typically performed by the archiving plug-in 220 performing a search on the archive to see if the archive contains any objects that match the user's search query and/or parameters. As mentioned before, however, this results in performance degradation when the archive is empty, or at least is empty of data that could potentially be searched by the user.

As such, in an example embodiment, when a session is begun, the archiving plug-in 220 checks the archive 240 to determine if it contains any objects that could possibly be searched upon. This may be a check for, for example, an object of any archivable object type. If no such objects exist in the archive 240, then a flag is set, indicating as such (e.g., flag is set to "1"). On the other hand, if at least one such object exists in the archive 240, then a flag is left unset (e.g., flag is kept at "0").

Then, when a search request is received by the archiving plug-in 220, rather than simply blindly performing a search of the archive for objects that match the search query/parameters, it first checks the flag. If the flag is set, then the search request is ignored, resulting in no performance degradation. Only if the flag is not set will the search request be processed by the archiving plug-in.

When the search request is processed, the archiving plug-in searches the archive for objects matching the search query/parameters and returns them to the user as the hit list. The user then selects items to access from the hit list and returns the identifications of these selected items to the archiving plug-in 220. The archiving plug-in 220 then retrieves the corresponding archived data, subject to access control verification by the access management system 230.

More particularly, the software application 210 may receive, from the access management system 230, a result of the verification of access rights to the archived data for the user of the software application 210. For example, the result may indicate whether or not the user has permission to access the archived data. The software application 210 may be configured to cause a response to be displayed on a computing device 205 of the user based on the result of the verification of access rights to the archived data for the user. In some example embodiments, the causing of the response to the request to be displayed on the computing device 205 of the user may comprise causing the archived data to be displayed on the computing device 205 of the user and based on the result of the verification of access rights comprising granting the user access to the archived data. In other example embodiments, the causing of the response to the request to be displayed on the computing device 205 of the user may comprise causing an error message to be displayed on the computing device 205 of the user and based on the result of the verification of access rights comprising denying the user access to the archived data.

Figure 3:
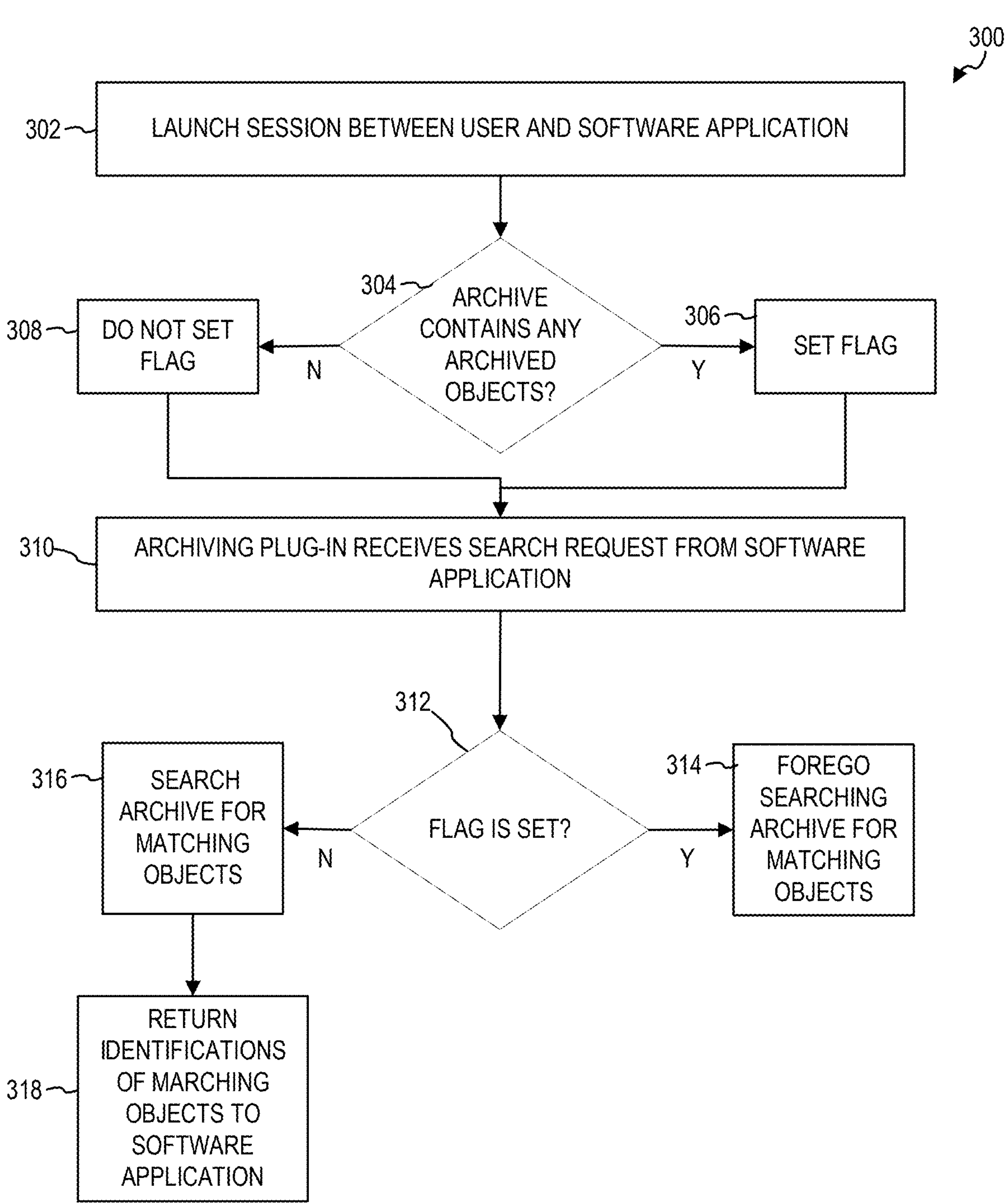
FIG. 3 is a flowchart illustrating an example method, in accordance with an example embodiment.

FIG. 3 is a flowchart illustrating an example method 300, in accordance with an example embodiment. The method 300 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 300 are performed by the archiving system 200 of FIG. 2 or any combination of one or more of its components.

At operation 302, a session is launched between a user and a software application. At operation 304, in response to the launching, it is determined whether an archive contains any archived objects. If so, then at operation 306 a flag is set. If not, then at operation 308 the flag is not set.

At operation 310, an archiving plug-in receives a search request from the software application. At operation 312, in response to the receiving the search request, the archiving plug-in checks the flag. If it is set, then at operation 314 the archiving plug-in foregoes searching the archive to locate objects matching the search request.

If, on the other hand, the flag is not set, then at operation 316 the archiving plug-in searches the archive to locate objects matching the search request and at operation 318 identifications of any such matching objects are returned to the software application for display in a graphical user interface.

In view of the disclosure above, various examples are set forth below. It should be noted that one or more features of an example, taken in isolation or combination, should be considered within the disclosure of this application.

Example 1 is a system comprising: at least one hardware processor; a non-transitory computer-readable medium storing instructions that, when executed by the at least one hardware processor, cause the at least one hardware processor to perform operations comprising: launching a session between a user and a software application; in response to the launching, determining whether an archive contains any archived objects; in response to a determination that the archive does not contain any archived objects, setting a flag indicating that the archive does not contain any archived objects; receiving, at an archiving plug-in, a search request from the software application; in response to the receiving, checking, by the archiving plug-in, the flag; and in response to the checking determining that the flag indicates that the archive contains at least one archived object: performing a search on the archive to locate one or more objects matching the search request; checking whether the user has access rights to one or more matching objects; and returning an identification of any matching objects to which the user has access rights to the software application.

In Example 2, the subject matter of Example 1 includes, wherein the operations further comprise: in response to the checking determining that the flag indicates that the archive does not contain any archived objects, foregoing searching the archive to locate objects matching the search request.

In Example 3, the subject matter of Examples 1-2 includes, wherein the performing the search on the archive includes identifying any objects matching a search query and/or search parameters of the search request.

In Example 4, the subject matter of Examples 1-3 includes, wherein the operations further comprise: causing the identification of any matching objects in the archive to be displayed in a graphical user interface.

In Example 5, the subject matter of Example 4 includes, wherein the operations further comprise: receiving a selection of one or more matching objects to retrieve.

In Example 6, the subject matter of Example 5 includes, wherein the operations further comprise: in response to receiving the selection, determining whether the user can access the one or more matching objects by querying an access management system.

In Example 7, the subject matter of Examples 1-6 includes, wherein the software application is an enterprise application.

Example 8 is a method comprising: launching a session between a user and a software application; in response to the launching, determining whether an archive contains any archived objects; in response to a determination that the archive does not contain any archived objects, setting a flag indicating that the archive does not contain any archived objects; receiving, at an archiving plug-in, a search request from the software application; in response to the receiving, checking, by the archiving plug-in, the flag; and in response to the checking determining that the flag indicates that the archive contains at least one archived object: performing a search on the archive to locate one or more objects matching the search request; checking whether the user has access rights to one or more matching objects; and returning an identification of any matching objects to which the user has access rights to the software application.

In Example 9, the subject matter of Example 8 includes, in response to the checking determining that the flag indicates that the archive does not contain any archived objects, foregoing searching the archive to locate objects matching the search request.

In Example 10, the subject matter of Examples 8-9 includes, wherein the performing the search on the archive includes identifying any objects matching a search query and/or search parameters of the search request.

In Example 11, the subject matter of Examples 8-10 includes, causing the identification of any matching objects in the archive to be displayed in a graphical user interface.

In Example 12, the subject matter of Example 11 includes, receiving a selection of one or more matching objects to retrieve.

In Example 13, the subject matter of Example 12 includes, in response to receiving the selection, determining whether the user can access the one or more matching objects by querying an access management system.

In Example 14, the subject matter of Examples 8-13 includes, wherein the software application is an enterprise application.

Example 15 is a non-transitory machine-readable medium storing instructions which, when executed by one or more processors, cause the one or more processors to perform operations comprising: launching a session between a user and a software application; in response to the launching, determining whether an archive contains any archived objects; in response to a determination that the archive does not contain any archived objects, setting a flag indicating that the archive does not contain any archived objects; receiving, at an archiving plug-in, a search request from the software application; in response to the receiving, checking, by the archiving plug-in, the flag; and in response to the checking determining that the flag indicates that the archive contains at least one archived object: performing a search on the archive to locate one or more objects matching the search request; checking whether the user has access rights to one or more matching objects; and returning an identification of any matching objects to which the user has access rights to the software application.

In Example 16, the subject matter of Example 15 includes, wherein the operations further comprise: in response to the checking determining that the flag indicates that the archive does not contain any archived objects, foregoing searching the archive to locate objects matching the search request.

In Example 17, the subject matter of Examples 15-16 includes, wherein performing the search on the archive includes identifying any objects matching a search query and/or search parameters of the search request.

In Example 18, the subject matter of Examples 15-17 includes, wherein the operations further comprise: causing the identification of any matching objects in the archive to be displayed in a graphical user interface.

In Example 19, the subject matter of Example 18 includes, wherein the operations further comprise: receiving a selection of one or more matching objects to retrieve.

In Example 20, the subject matter of Example 19 includes, wherein the operations further comprise: In response to the receiving a selection, determining whether the user can access the one or more matching objects by querying an access management system.

Example 21 is at least one machine-readable medium including instructions that, when executed by processing circuitry, cause the processing circuitry to perform operations to implement of any of Examples 1-20.

Example 22 is an apparatus comprising means to implement of any of Examples 1-20.

Example 23 is a system to implement of any of Examples 1-20.

Example 24 is a method to implement of any of Examples 1-20.

Certain embodiments are described herein as comprising logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules.

The performance of certain operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 4:
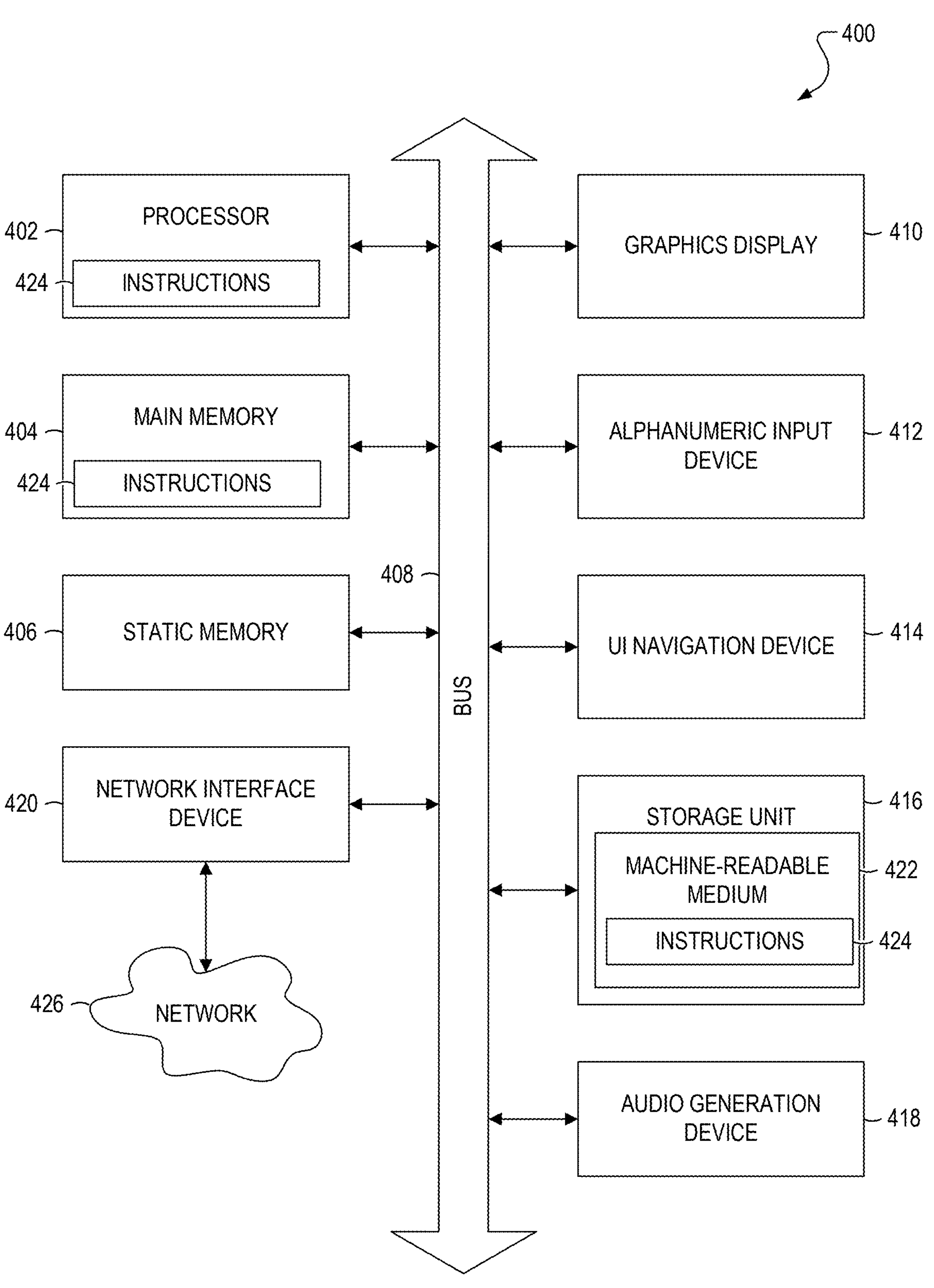
FIG. 4 is a block diagram of an example computer system on which methodologies described herein can be executed.

FIG. 4 is a block diagram of a machine in the example form of a computer system 400 within which instructions 424 for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404, and a static memory 406, which communicate with each other via a bus 408. The computer system 400 may further include a graphics or video display unit 410 (e.g., a liquid crystal display (LCD) or a cathode ray tube [CRT]). The computer system 400 also includes an alphanumeric input device 412 (e.g., a keyboard), a user interface (UI) navigation (or cursor control) device 414 (e.g., a mouse), a storage unit (e.g., a disk drive unit) 416, an audio or signal generation device 418 (e.g., a speaker), and a network interface device 420.

The storage unit 416 includes a machine-readable medium 422 on which is stored one or more sets of data structures and instructions 424 (e.g., software) embodying or utilized by any one or more of the methodologies or functions described herein. The instructions 424 may also reside, completely or at least partially, within the main memory 404 and/or within the processor 402 during execution thereof by the computer system 400, the main memory 404 and the processor 402 also constituting machine-readable media. The instructions 424 may also reside, completely or at least partially, within the static memory 406.

While the machine-readable medium 422 is shown in an example embodiment to be a single medium, the term "machine-readable medium" may include a single medium or multiple media (e.g., a centralized or distributed database, and/or associated caches and servers) that store the one or more instructions 424 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 424 may further be transmitted or received over a communications network 426 using a transmission medium. The instructions 424 may be transmitted using the network interface device 420 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A system comprising:

at least one hardware processor;

a non-transitory computer-readable medium storing instructions that, when executed by the at least one hardware processor, cause the at least one hardware processor to perform operations comprising:

launching a session between a user and a software application;

in response to the launching, determining whether an archive contains any archived objects;

in response to a determination that the archive does not contain any archived objects, setting a flag indicating that the archive does not contain any archived objects;

receiving, at an archiving plug-in, a search request from the software application;

in response to the receiving, checking, by the archiving plug-in, the flag; and in response to the checking, determining that the flag has changed to now indicate that the archive contains at least one archived object:

performing a search on the archive to locate one or more objects matching the search request;

checking whether the user has access rights to one or more matching objects; and returning an identification of any matching objects to which the user has access rights to the software application.

2. The system of claim 1, wherein the operations further comprise:

in response to the checking determining that the flag indicates that the archive does not contain any archived objects, foregoing searching the archive to locate objects matching the search request.

3. The system of claim 1, wherein the performing the search on the archive includes identifying any objects matching a search query and/or search parameters of the search request.

4. The system of claim 1, wherein the operations further comprise:

causing the identification of any matching objects in the archive to be displayed in a graphical user interface.

5. The system of claim 4, wherein the operations further comprise:

receiving a selection of one or more matching objects to retrieve.

6. The system of claim 5, wherein the operations further comprise:

in response to receiving the selection, determining whether the user can access the one or more matching objects by querying an access management system.

7. The system of claim 1, wherein the software application is an enterprise application.

8. A method comprising:

launching a session between a user and a software application;

in response to the launching, determining whether an archive contains any archived objects;

in response to a determination that the archive does not contain any archived objects, setting a flag indicating that the archive does not contain any archived objects;

receiving, at an archiving plug-in, a search request from the software application;

in response to the receiving, checking, by the archiving plug-in, the flag; and in response to the checking, determining that the flag has changed to now indicate that the archive contains at least one archived object:

performing a search on the archive to locate one or more objects matching the search request;

checking whether the user has access rights to one or more matching objects; and returning an identification of any matching objects to which the user has access rights to the software application.

9. The method of claim 8, further comprising:

in response to the checking determining that the flag indicates that the archive does not contain any archived objects, foregoing searching the archive to locate objects matching the search request.

10. The method of claim 8, wherein the performing the search on the archive includes identifying any objects matching a search query and/or search parameters of the search request.

11. The method of claim 8, further comprising:

causing the identification of any matching objects in the archive to be displayed in a graphical user interface.

12. The method of claim 11, further comprising:

receiving a selection of one or more matching objects to retrieve.

13. The method of claim 12, further comprising:

in response to receiving the selection, determining whether the user can access the one or more matching objects by querying an access management system.

14. The method of claim 8, wherein the software application is an enterprise application.

15. A non-transitory machine-readable medium storing instructions which, when executed by one or more processors, cause the one or more processors to perform operations comprising:

launching a session between a user and a software application;

in response to the launching, determining whether an archive contains any archived objects;

in response to a determination that the archive does not contain any archived objects, setting a flag indicating that the archive does not contain any archived objects;

receiving, at an archiving plug-in, a search request from the software application;

in response to the receiving, checking, by the archiving plug-in, the flag; and in response to the checking, determining that the flag has changed to now indicate that the archive contains at least one archived object:

performing a search on the archive to locate one or more objects matching the search request;

checking whether the user has access rights to one or more matching objects; and returning an identification of any matching objects to which the user has access rights to the software application.

16. The non-transitory machine-readable medium of claim 15, wherein the operations further comprise:

in response to the checking determining that the flag indicates that the archive does not contain any archived objects, foregoing searching the archive to locate objects matching the search request.

17. The non-transitory machine-readable medium of claim 15, wherein performing the search on the archive includes identifying any objects matching a search query and/or search parameters of the search request.

18. The non-transitory machine-readable medium of claim 15, wherein the operations further comprise:

causing the identification of any matching objects in the archive to be displayed in a graphical user interface.

19. The non-transitory machine-readable medium of claim 18, wherein the operations further comprise:

receiving a selection of one or more matching objects to retrieve.

20. The non-transitory machine-readable medium of claim 19, wherein the operations further comprise:

In response to the receiving a selection, determining whether the user can access the one or more matching objects by querying an access management system.

* * * * *